Patented Sept. 23, 1924.

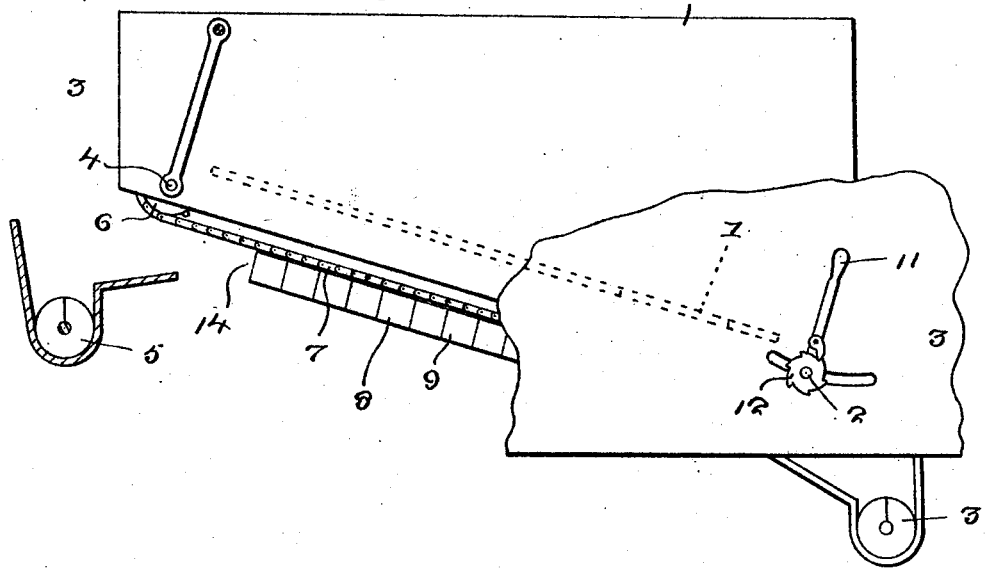
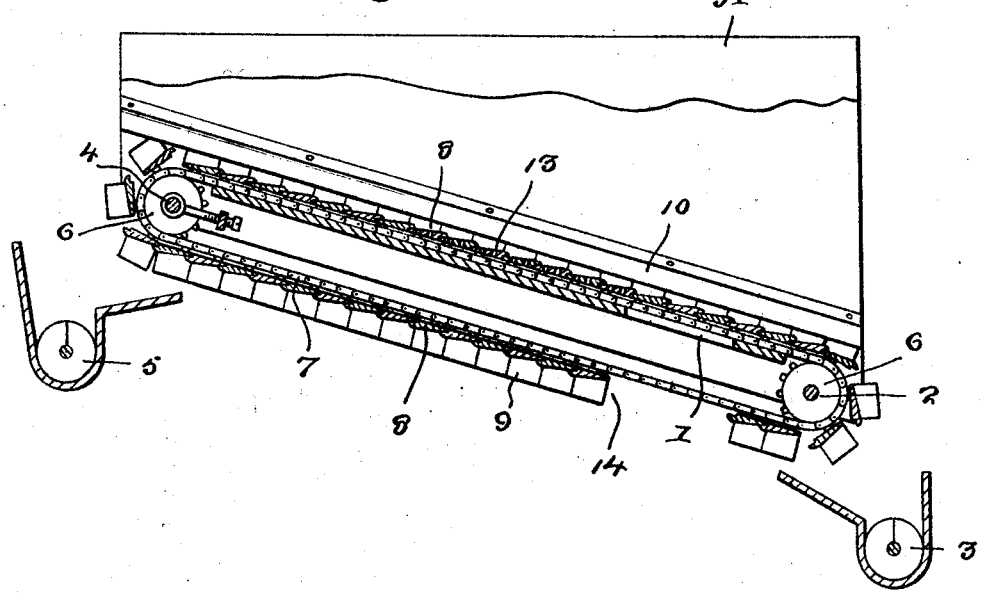

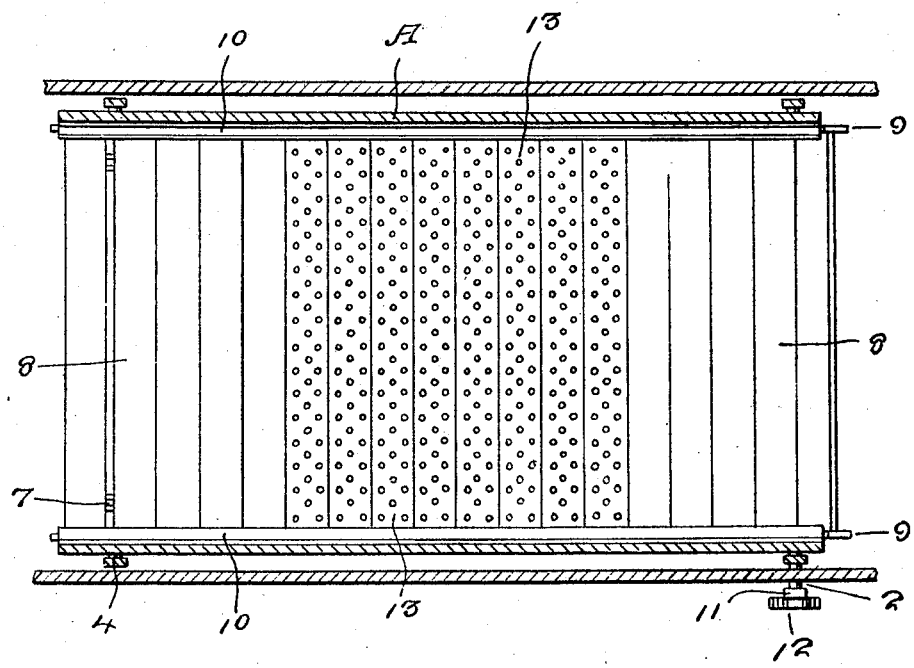
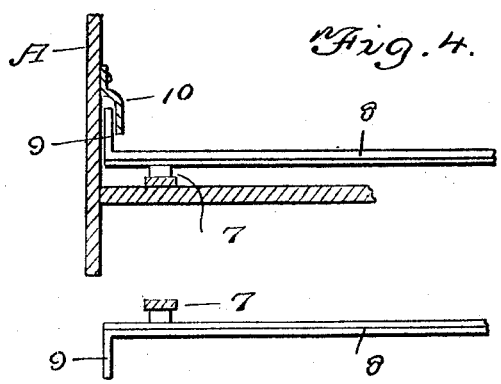

1,509,712

UNITED STATES PATENT OFFICE.

BERT C. CHAPPELL, OF ROCKVILLE, MISSOURI.

THRASHER.

Application filed August 6, 1921. Serial No. 490,249.

*To all whom it may concern:*

Be it known that I, BERT C. CHAPPELL, a citizen of the United States, residing at Rockville, in the county of Bates and State of Missouri, have invented new and useful Improvements in Thrashers, of which the following is a specification.

This invention relates to improvements in shoes for thrashing machines, the general object of the invention being to provide means for moving a "cheat" sieve into and out of operative position without stopping the thrasher.

Another object of the invention is to provide an endless apron at the bottom of the shoe and which carries the sieve and which is provided with a door for cooperating with the door in the bottom of the shoe.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic view showing a part of the thrashing machine supplied with my invention.

Figure 2 is an enlarged vertical sectional view of a shoe constructed in accordance with my invention.

Figure 3 is a horizontal sectional view of the shoe.

Figure 4 presents detail views of the grain shield.

In these views A indicates the shoe of the thrashers which is of the usual or any desired type and the bottom of which is provided with the door 1. A shaft 2 extends across the bottom of the shoe adjacent the grain conveyor 3 and a similar shaft 4 is located adjacent the tailings conveyor 5. These shafts carry the sprockets 6 over which the endless chains 7 pass. These chains support the leaves which form the apron 8. Any number of these chains and their supporting sprockets may be used to firmly support the apron as will be understood. The leaves of the apron have their ends bent outwardly at right angles, as shown at 9, for preventing the grain from passing over said end and a shield 10 is placed on each side of the shoe with its lower end overlapping the bent ends of the leaves to prevent grain from falling between the sides of the shoe and the edges of the apron. A lever 11 is pivoted to shaft 2 and said lever is connected with the shaft by the ratchet mechanism 12 so that the oscillation of the lever will cause the shaft to rotate to move the apron. A part of the apron is formed by the "cheat" sieve 13 and a door 14 is formed in the apron, said door being so placed in relation to the sieve that it will register with the door 1 of the shoe when the sieve is in operative position, as shown in Figure 2. When the use of a cheat sieve is not necessary the parts are moved to a position where the sieve 13 is moved to the under side so that the floor of the shoe is formed of the solid leaves which cover the door 1, thus permitting the shoe to be used in the ordinary manner and without a cheat sieve. When the sieve portion is in use the cheat seeds will drop through the door 1 and the door 14 in the apron.

It will thus be seen that the sieve can be placed into operative and inoperative position from the exterior of the thrasher and without stopping the machine, thus saving the time now necessary to put in position and remove from position the screens now in use.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a thrasher, a thrasher shoe having an opening in the floor thereof, an endless apron movable over the said floor and having a sieve portion for registration with the said opening, and means for adjusting the apron to move the sieve portion into and out of registration with the said opening.

2. In a thrasher, a thrasher shoe having an opening in the floor thereof, an endless apron movable across said opening and having a sieve portion at one point in its length and a gap at another point said sieve and gap being registerable simultaneously with the said opening in the floor, and means for adjusting the apron for moving the said gap and sieve simultaneously into registration with the said opening.

3. In a thrasher, a thrasher shoe having an opening in the floor thereof, an endless apron said apron comprising overlapping leaves movable over said opening, a sieve forming part of the apron, said leaves having their ends bent outwardly at right angles, and shields on the sides of the shoe and overlapping said bent ends of the leaves.

4. In a thrasher, a thrasher shoe having an opening in the floor, an endless apron movable over said opening said apron having a door and a sieve portion positioned for simultaneously registering with the opening in the floor and from opposite sides of the latter in a predetermined position of the apron, and means for adjusting said apron to move the sieve portion and the door simultaneously into or out of registration with the said opening.

In testimony whereof I affix my signature.

BERT C. CHAPPELL.